April 4, 1967 J. H. ANDERSON ETAL 3,312,054
SEA WATER POWER PLANT
Filed Sept. 27, 1966 3 Sheets-Sheet 1
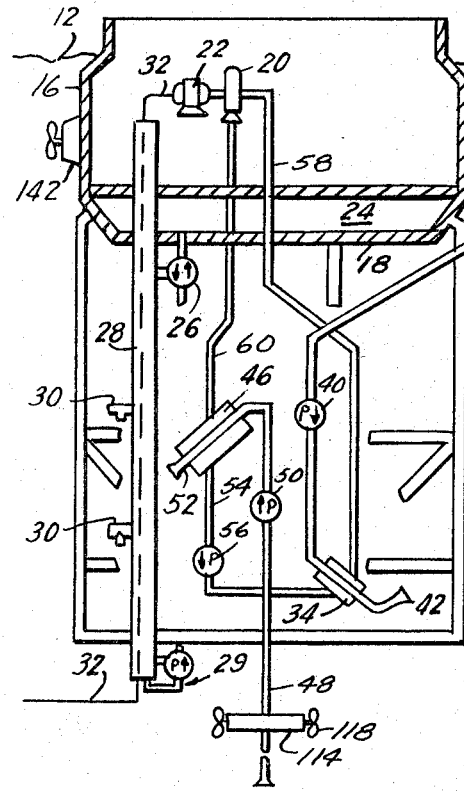
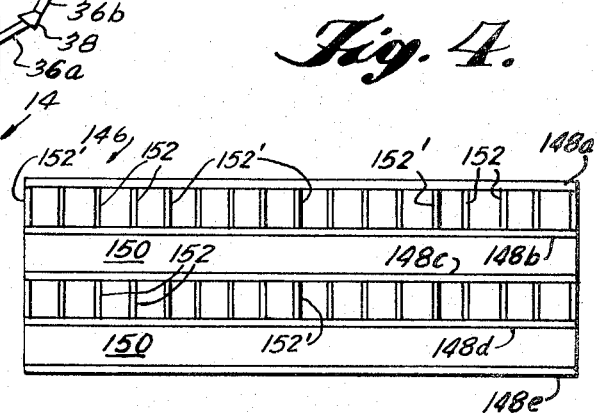
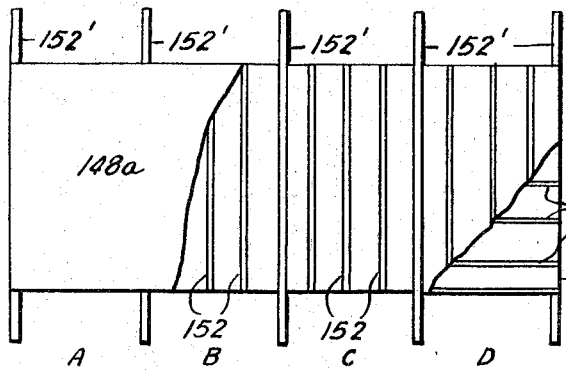
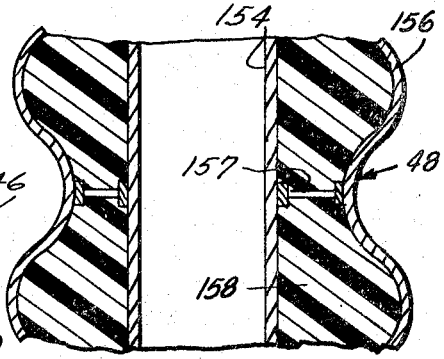
INVENTORS
JAMES H. ANDERSON
JAMES H. ANDERSON, JR.
BY Cushman, Darby & Cushman
ATTORNEYS

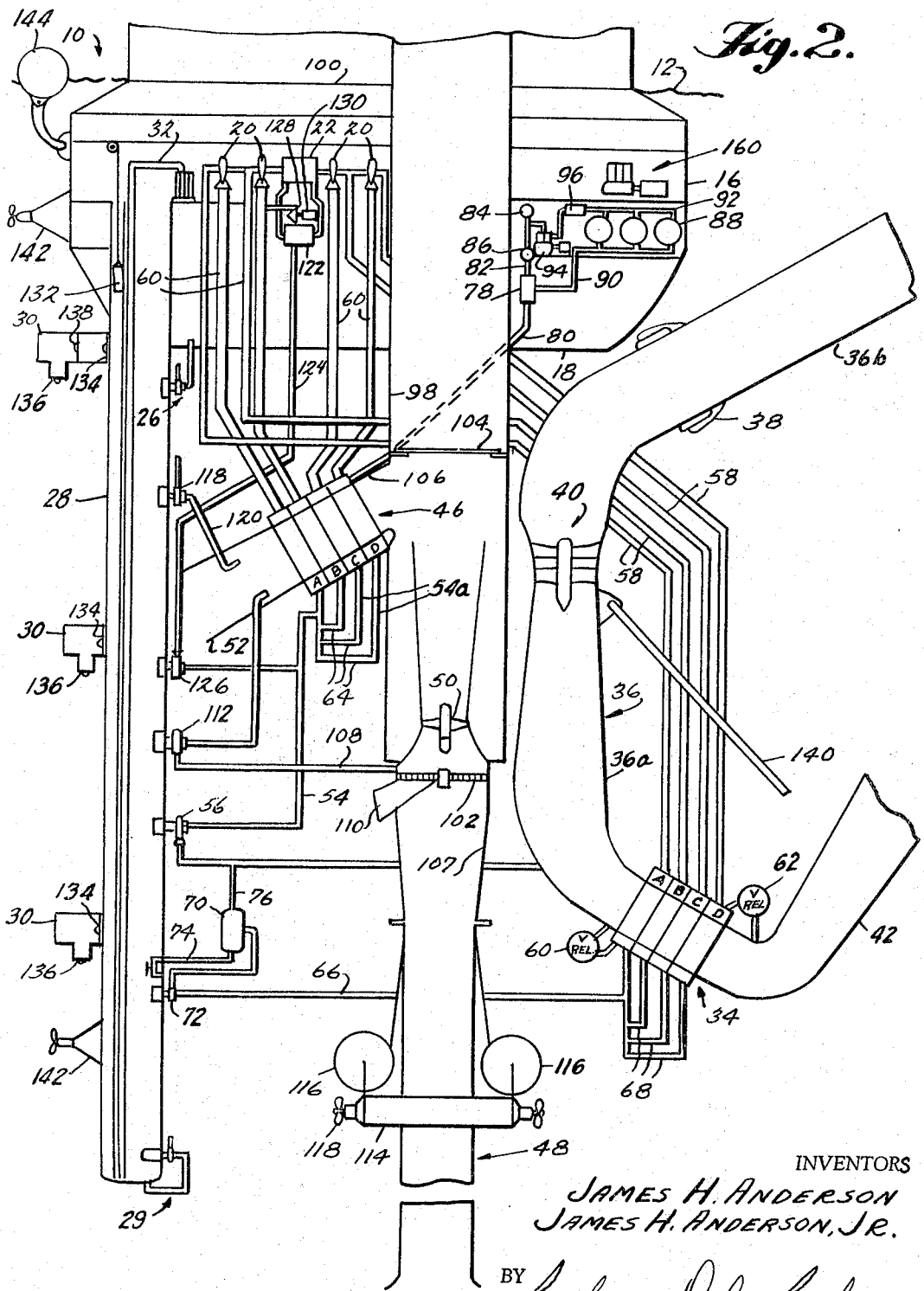

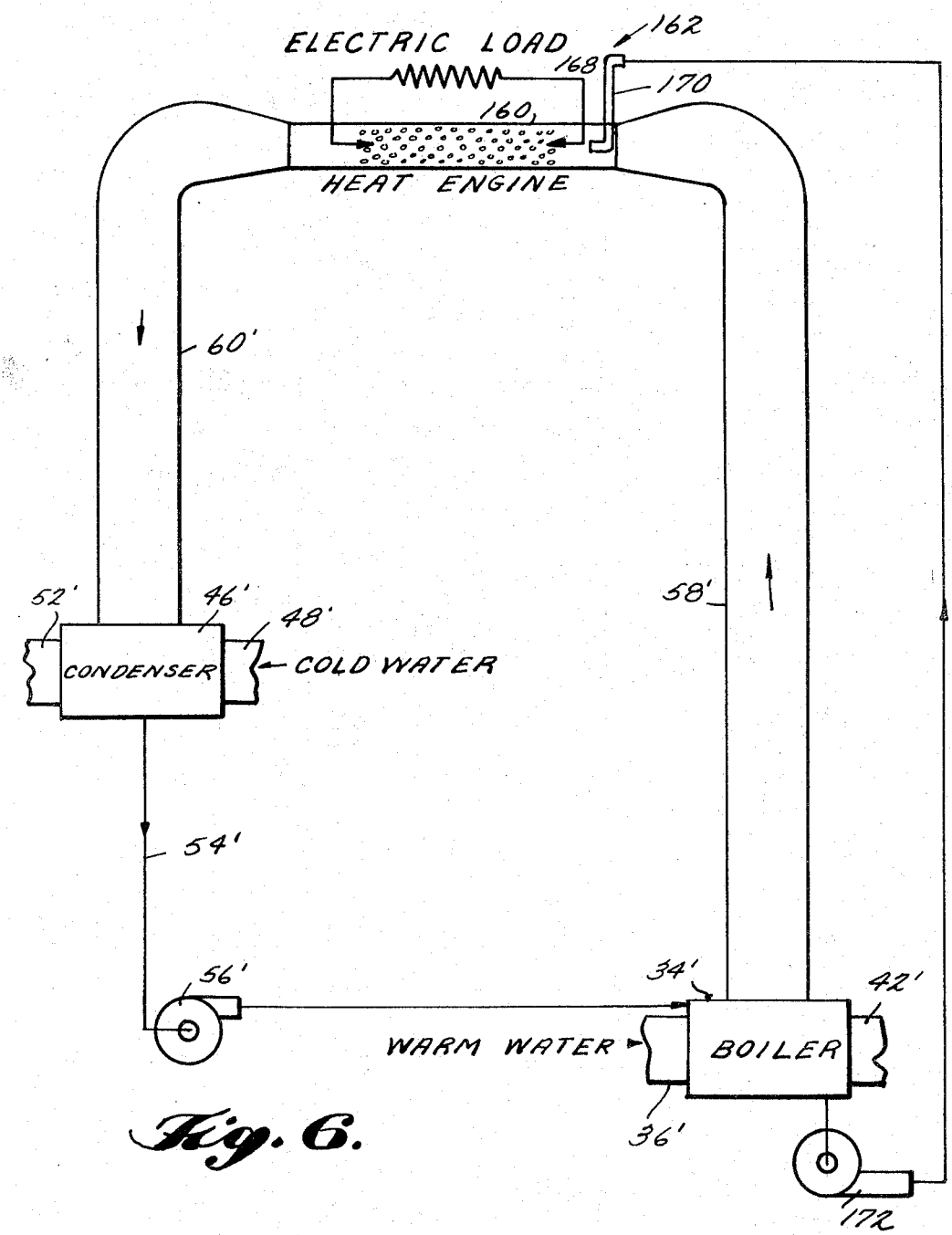

3,312,054
SEA WATER POWER PLANT
James H. Anderson and James H. Anderson, Jr., both of 1615 Hillock Lane, York, Pa. 17403
Filed Sept. 27, 1966, Ser. No. 600,287
21 Claims. (Cl. 60—26)

This application is a continuation-in-part of application, Ser. No. 547,690, now abandoned, which is a continuation of application, Ser. No. 393,283, filed Aug. 31, 1964, now abandoned.

This invention relates to the extraction of useful energy from the sea and in particular to power plants in which the initial driving force for obtaining power is the temperature differential between layers of sea water.

It has been suggested in the past, for example in the United States patent to Claude et al. 2,006,985 issued July 2, 1935, that the heat in warm surface water of tropical seas can be utilized to form steam for driving a power producing turbine. In the system suggested by Claude et al. warm sea water was pumped to an elevated tank which was maintained under sufficient vacuum by means of a barometric leg to cause the warm sea water to boil. The resulting low pressure, low density steam was passed to a power generating turbine and then to a condenser which was maintained under vacuum by a pump. In the condenser the steam was condensed with cold sea water which was pumped from deep in the sea. The condensed steam was then discharged to the sea.

While a system of the Claude design is operable, it possesses several serious disadvantages which render it uneconomical. The primary disadvantage results from the low density and low pressure of the steam. In order to obtain usable power from such a fluid very large volumes of the fluid must be handled, and consequently a very large, costly turbine must be employed. In addition, the efficiency of the turbine is low because of the low density of the steam. Other disadvantages of the Claude system are those, now well recognized in the field of conversion of sea water to fresh water, of degasification of sea water and scaling of boiler parts.

The present invention contemplates an energy extraction system in which the heat energy of warm surface water is converted or transferred to a vaporized working fluid of predetermined physical properties and under special conditions such that important advantages in economy of construction and efficiency in operation are realized over a system in which a vaporized working fluid is employed at low pressure and low vapor density, as in the Claude system. The working fluid is a material having a superatmospheric vapor pressure at the temperatures of the available warm and cold water and preferably having a vapor density greater than the vapor density of water. The working fluid, within a closed circuit, is vaporized in a boiler by heat exchange with the warm water and is subsequently condensed in a condenser by heat exchange with the cold water and then returned to the boiler. The vaporized working fluid is expanded during its passage from the boiler to the condenser and the resulting pressure drop is employed by any known power extracting gas expansion device to extract energy from the vapor. The power extracting device may be, for example, a mechanical expansion engine such as a turbine or piston engine, or a direct energy conversion machine such as an electrogasdynamic machine.

The special conditions under which the working fluid is vaporized and subsequently condensed provide that one or both of these operations are carried out at a pressure which is close to the pressure of the water being used for that operation to thereby carry out the operation with little or no pressure differential between the water and the working fluid. This is accomplished by submerging either the boiler or the condenser or both to a depth in the body of water at which the water pressure approximates the vapor pressure of the working fluid in the respective piece of equipment. Under this condition the pressure differential between the water side and the working fluid side of the equipment will be small. This allows the equipment to be constructed with thin internal separator members which are not only less costly than conventional heat exchanger tubes but also afford very high heat transfer rates. Since the boiler and condenser must handle enormous quantities of sea water, they must be very large, and any improvement in the economics of construction and efficiency of operation is of great importance.

A very suitable working fluid, particularly when power is to be extracted by an expansion engine, is propane. The reason for employing a fluid such as propane, rather than water is that the boiling pressure of the former at the temperature of warm sea water, e.g. 77° F., is 137 p.s.i.a. (pounds per square inch absolute) whereas steam at this temperature boils at a pressure of 0.46 p.s.i.a. The corresponding specific volumes in cubic feet per pound of gas are 0.80 for propane and 695 for steam. Because of the vastly smaller specific volume for propane the size of a turbine and associated pipes for a propane system are much smaller than for a water system operating at the same temperature. Accordingly, the smaller volume of gas to be handled makes the propane turbine power plant much more economical to build than a water turbine plant. Not only does a propane turbine have to handle a much smaller volume of gas for a unit of power than does steam under these conditions, but also propane has a much lower isentropic enthalpy drop. For this reason fewer turbine stages or lower velocities are required in the turbine. For example, the enthalpy drop in steam from 77° F. is 51.1 B.t.u./lb., whereas for propane it is only 8.2 B.t.u./lb. The theoretical nozzle spouting velocity would be 1600 ft./sec. for steam and 640 ft./sec. for propane.

Because of the much smaller turbine size per unit of power for propane, the turbine can run at a higher rotative speed. This in turn means that the generator can be smaller and less costly.

It is also well known that propane is much less corrosive than water, and there would be no deposits or scaling in the propane circuit. Since the entire propane system would be above atmospheric pressure, there would be little chance of corrosive sea air leaking into the system.

In the specific embodiment which is described in detail hereinafter, the boiler, which is a heat exchanger of the type having hot and cold flow channels sealed from each other, will receive surface water at, for example, 77° F. If liquid propane is heated to this temperature it will have a vapor pressure of 137 p.s.i.a., that is, it will boil at 137 p.s.i.a. If the boiler is submerged at a depth of 276 feet, the pressure of the water being pumped down from the surface will also be 137 p.s.i.a. and consequently there is no pressure differential across the heat exchange surfaces in the boiler. The same principles of submergence and construction apply to the propane condenser. If deep sea water were available at 50° F., the propane pressure within the condenser would be 91.7 p.s.i.a. Submergence of the condenser to 173 feet would equalize the pressures on the propane and water sides of the condenser, assuming no temperature difference.

Another important feature of the invention lies in the physical arrangement of the power plant and the warm and cold water inlet pipes with respect to the sea. Preferably, the power plant is constructed as a floating structure located over the point from which cold, deep sea water is to be pumped. This arrangement not only permits the necessary submergence of boiler and condenser with relatively short pipes to the energy extraction device, but also it avoids an excessively long cold water pipe. Cold water may lie 2000 feet or more below the surface and considerably more than a mile from shore. A pipe extending along the sea bottom from such a depth to the depth of the condenser is disadvantageous from the standpoint of friction drop in the cold water flow due to the length of the pipe and from the standpoint of the mechanical difficulties associated with the laying and maintaining the pipe in leakproof condition. Further, a long cold water pipe permits excessive warming of the cold water as it is brought up through warmer water.

The floating power plant of the present invention includes a buoyant hull, a depending cold water pipe suspended therefrom and a depending framework for supporting the boiler, condenser and the associated piping and pumps at the necessary depths. Preferably, the hull extends deep enough into the water to locate its lower end below the effect of wave action. The hull provides space for the energy extraction device and other equipment and living space for an operating crew. The boiler and condenser are mounted in the water on the framework and are accessible by divers lowered from the hull. A sealed, vertical access tube extends downwardly from the hull so that the divers may enter the water at different depths through compression chambers carried by the tube.

Accordingly, it is a primary object of the present invention to provide an efficient and economical method and apparatus for extracting energy from sea water employing the temperature difference between layers of sea water as the initial driving force for operating a heat engine.

It is another object of the invention to provide a method and apparatus for the above purpose which overcomes the disadvantages associated with boiling sea water and employing the thus obtained low temperature and low pressure steam as the working fluid in a tubine power plant.

It is a more specific object to overcome the aforesaid disadvantages by employing a working fluid which boils at the temperature of warm sea water to produce a vapor of relatively high pressure and density thereby permitting higher turbine efficiency and smaller turbine size than can be had with a steam system.

It is another specific object to provide a method and apparatus employing the aforesaid working fluid in which at least one of the heat exchangers for transferring heat between sea water and working fluid is submerged in the sea to a depth at which the pressures on the water and working fluid sides of the heat exchangers are substantially equal whereby the exchanger may be of lightweight and economical construction.

It is a further object to provide a power plant embodying the aforesaid principles, preferably on a floating hull, which is located generally above the point from which cold sea water is to be obtained thereby effecting ready submergence of the heat exchangers to the necessary depths and thereby permitting the use of a relatively short cold water inlet pipe.

The invention will be further understood from the following detailed description in conjunction with the drawings in which:

FIGURE 1 is a diagrammatic elevational view of a floating sea water power plant showing the principal elements thereof in simplified form;

FIGURE 2 is a diagrammatic view on a larger more detailed scale, of the power plant of FIGURE 1;

FIGURE 3 is a top plan view, partly broken away, of a heat exchanger core suitable for use in the boiler or condenser of the power plant;

FIGURE 4 is a side view of a portion of the heat exchanger core of FIGURE 3;

FIGURE 5 is a fragmentary axial sectional view of part of a pipe for use in conducting cold sea water upwardly from deep in the sea; and FIGURE 6 is a schematic view illustrating a system for obtaining electric current directly from the vaporized working fluid without employing a turbine and generator.

GENERAL DESCRIPTION

Referring to FIGURE 1 there is shown in simplified diagrammatic form a floating power plant which illustrates the principles of the present invention. The power plant includes a buoyant hull 10 floating with its upper end above the level 12 of the sea and having a depending, submerged open framework 14 for supporting parts of the plant below the water level 12. The hull includes side walls 16 and a bottom wall 18 which define a space for one or more turbines 20, an electric generator 22 driven by the turbine 20 and living space for an operating crew. The lower end of the hull 10 includes a ballast tank 24 and pumping system 26 for pumping sea water into and out of the tank to adjust the height of the hull 10 in the sea.

The depending framework 14 is primarily for the purpose of supporting a boiler and condenser system for boiling and condensing working fluid employed to drive the turbine 20. Also supported by the framework is a depending access tube 28 which extends generally to the bottom of the framework. The lower end of the access tube 28 is sealed and prevented with a bilge pump 29 and the upper end communicates with the interior of the hull 10 so that men and equipment can be lowered therethrough. Compression chambers 30 having doors opening to the seat are provided at spaced locations along the length of the access tube 28 so that divers may descend the tube and enter the water at different levels for maintenance purposes. The tube 28 also serves to carry an electric cable 32 which extends from the generator 22 downwardly through the lower sealed end of the tube and thence to shore or other consumer location.

The system for handling the working fluid, which for purposes of illustrating the invention, is designated as propane, includes a propane boiler 34 which is constructed in the form of a heat exchanger for passing warm surface water in heat exchange relationship with liquid propane to cause the latter to boil. As already described, propane at a temperature of 77° F. (a typical surface water temperature for a tropical climate) boils at a pressure corresponding to the pressure of sea water 276 feet below the surface. In the illustrated construction, therefore, the boiler 34 is supported on the framework 14 276 feet below water level so that the pressure in the water channels of the exchanger is the same as the pressure in the propane channels. Warm sea water is conducted from a point very near the surface of the seat to the boiler 34 through a large diameter warm water inlet pipe 36 which includes several sections 36a, 36b and 36c joined together by swivel connections 38. The lowermost section 36a is supported within the framework 14 and contains a pump 40 for pumping warm sea water to the propane boiler and thence to an upwardly facing flared diffuser 42 which discharges the water back to the sea. The uppermost section 36c terminates just below the water surface 12 at a location to one side of the hull and is supported by a float 44. Ordinarily it will be desirable to provide a screen or the like at the inlet end to prevent debris from entering the boiler.

The working fluid circuit further includes a propane condenser 46 which is a heat exchanger supported by the framework 14 at a depth of 173 feet at which the water pressure is 91.7 p.s.i.a. Propane will be condensed at a temperature of 50° F. (a typical deep sea temperature for a tropical climate) at this pressure and, accordingly, the pressure on both sides of the heat exchanger separators will be the same. Cold deep sea water is conducted to the condenser 46 through a long vertical pipe 48 which is carried within the framework 14 and which is provided with a pump 50. The lower end of the pipe 48 extends far below the framework to a depth of, for example, 2000 feet. After passing through the condenser 46 the sea water is discharged to the sea through a generally, downwardly facing outlet 52. Condensed propane leaves the condenser 46 through a downwardly extending line 54 which contains a pump 56 for passing the liquid through the propane channels of the propane boiler 34. From the boiler 34 propane vapor passes upwardly through a line 58 to the turbine 20 where it is expanded to produce work for operating the generator 22. The expanded propane vapor is returned to the propane condenser through a line 60.

DETAILED DESCRIPTION

Referring now to the more detailed illustration of the power plant, as shown in FIGURE 2 wherein the framework has been omitted for simplicity, it will be seen that the turbine arrangement carried within the hull includes four single stage turbines 20 having a common shaft which drives the generator 22. Each turbine 20 has a separate inlet line 58 which conducts propane vapor from a separate set of flow channels in the boiler 34. The latter is constructed in an inclined position with a single set of straight-through water channels extending from the higher, inlet end to the lower, outlet end. The sets of propane channels extend at right angles to the water channels and are disposed in four side-by-side groups A, B, C and D along the length of the water flow channels. An exemplary construction for the boiler is illustrated in FIGURES 3 and 4 and will be described more in detail hereinafter.

The sloping of the propane boiler 34 is desirable in order to match, as nearly as possible, the propane pressure in the channels A, B, C and D with the water pressure in the corresponding portions of the water channels. Factors which govern the degree and direction of slope include the temperature of the incoming water, the pressure drop in the water stream passing through the boiler and the depth to which the boiler is submerged in the sea. The latter factor, of course, affects both the internal water pressure and the static external pressure acting on the boiler. In the illustrated embodiment the propane channels A are in heat exchange relationship with the warmest water and therefore the boiling pressure will tend to be higher in these channels than in channels B, C and D where the water temperature is lower. Since the pressure of the water in the channels drops due to friction losses, the sloping of these channels downwardly toward their discharge ends tends to match the internal water pressure with the propane pressure in the sets of channels B, C and D. The water pressure at the boiler outlet will drop below the external static water pressure because the flared end of the discharge 42 converts some kinetic energy of flow to pressure and the static pressure at 42 must be equal to the external sea water pressure. Under some conditions of water temperature and friction losses it may be desirable to slope the boiler 34 in the opposite direction.

The propane condenser 46 is also constructed of a single set of downwardly inclined, straight-through water flow channels and four groups of transverse propane channels A, B, C and D disposed in side-by-side relationship along the length of the water channels. In this arrangement each set of the propane flow channels receives propane from one of the turbines which in turn has received the flow from the corresponding set of channels in the boiler 34. However, in the condenser structure the set of flow channels D which carries the lowest pressure propane is located at the upper end of the condenser. The purpose of this arrangement is to condense the low pressure propane with the coldest available water. As with the boiler 34 the sloping of the condenser 46 tends to match the internal water pressure with the propane pressure. Unlike the boiler 34, however, the condenser 46 should always be sloped so that its water discharge end is lower than the water inlet.

As a protection against accidentally raising the pressure difference across the heat exchange channels of the boiler 34 and condenser 46 to a level at which the channel separators would burst, relief valves may be provided to equalize the water and propane pressures within these pieces of equipment. As shown, a relief valve 60, provided between the water inlet pipe 40 to the boiler 34 and the set of propane channels A, opens at a predetermined maximum propane pressure to pass propane into the water side of the boiler 34. A similar relief valve 62 is provided between the propane channels D and the discharge portion of the water pipe to pass water to the propane channels if the water pressure becomes too high. Similar valves (not shown) will normally be provided for relieving potentially destructive pressure differences across the other channels in both the boiler 34 and the condenser 46.

The turbines 20 are designated as single stage, radial outflow type, although axial flow or radial inflow type could be employed. The radial outflow type is preferred because, in order to obtain high efficiency in a single stage turbine the longest part of the turbine flow path is the diffuser, or draft tube. In an axial flow or radial inflow turbine the diffuser is most conveniently axial, but in a radial outflow turbine it is partly a volute spiral and partly perpendicular to the axis. The latter arrangement is more convenient from the standpoint of assembly when a plurality of turbines is to be coupled to a common shaft and to a common generator.

Referring now to the details of the propane connections between the condenser 46 and the boiler 34 it will be seen that the discharge ends of each set of propane condenser channels A, B, C and D are connected to separate discharge lines 54a which in turn are connected to the main line 54 containing the pump 56. The lines from the lower pressure channels B, C and D are connected into the line from the higher pressure channels A through U-traps 64 to prevent liquid backflow from the higher to the lower propane channels. The main line 54 divides into four branches (not shown) as it approaches the boiler 34, and each branch is connected to the inlet end of one of the sets of channels A, B, C, D in that piece of equipment. Individual lines 58 extend from the outlet ends of the sets of channels to the different turbines 20.

The propane side of the boiler 34 is additionally provided with a drain system for removing any water which may have leaked into the propane channels and for draining away excess propane from the heat transfer surfaces. The system includes a main drain line 66 which receives liquid from the lower ends of each of the channels A, B, C through separate lines 66a. The lines from the channels B, C and D are connected to the line from channels A through U-traps 68 to prevent backflow. The drain system also contains a separator tank 70 to the middle of which the liquid in the line 66 is delivered by a pump 72. Any water which may have leaked into the propane side of the boiler will not be vaporized at the temperature therein and will settle to the bottom of the tank 70 from which it may be removed through a valved line 74. Liquid propane is removed from the top of the tank 70 and returned to the line 54 downstream of the pump 56 through a line 76.

Any water which leaks into the propane circuit may bring in dissolved air or other gases. These will eventually be released into the system and will tend to collect in the condenser, where they reduce condenser efficiency. In order to remove these gases there is provided a purge tank 78 which, as shown, is located within the floating hull 10. A line 80 extends from the top of the propane channels in the condenser 46 to the bottom of the tank 78 and thereby conducts away the noncondensible gases, which are lighter than the propane vapor. The gases can be vented to atmosphere from the top of the tank through a line 82 which contains valves 84 and 86.

A plurality of propane storage tanks 88 is disposed within the hull to store reserve supplies of liquid propane for charging the system at startup, for storage during repairs and for makeup of leakage. In the arrangement illustrated, the connection of the tanks 88 into the system is effected by a valved line 90 extending from the gas purge tank 78 to the bottom of the tanks 88 and by a line 92 extending from the top of the tanks 88 to a point in the line 82 between the valves 84 and 86. The line 92 contains a compressor 94 and a condenser 96 downstream thereof for the purpose of withdrawing propane vapor from the condenser 46 through the lines 80 and 82 and delivering it in liquid form to the tanks 88. If desired, noncondensible gases from the system may be vented from the condenser 96 as in conventional refrigeration practice. It will be appreciated that liquid propane could also be delivered to the tanks 88 by other means, such as a valved line (not shown) from the propane pump 56.

Referring now more in detail to the sea water circuit it will be appreciated that the cold water inlet pipe 48, being of great length, cannot conveniently be constructed as a unitary length. In order to simplify assembly of the pipe 48 the hull 10 is provided with a vertical tube 98 of large diameter which is permanently connected to the hull. The tube 98 extends downwardly from the bottom wall 18 of the hull and terminates in an open lower end disposed within the framework 14. At this depth there is relatively little wave action. Sections of pipe may then be assembled on an upper deck 100 of the hull 10 and lowered through the tube 98 into the water to form the pipe 48, sections being added one at a time at the top as the assembled sections are lowered. When the required length of pipe 48 has been assembled the top of the uppermost section is sealed to and suspended from the lower end of the tube 98. The lowering of the pipe 48, its assembly by adding on sections at the top and its suspension from the tube 98, may be accomplished by means of well known equipment and procedures employed in offshore oil and gas well construction and therefore these steps are not described here in detail.

When the pipe 48 has been set in place, a filter screen 102 is installed across its upper end. Then the pump 50 is lowered into the tube 98 and secured in place with its discharge facing upwardly. Finally a hatch cover 104 is installed above the pump 50 to seal the cold water flow path from the interior of the hull 10. The space above the hatch cover 104 is then pumped completely or partially free of water to increase the buoyancy of the hull 10. Just below the batch cover 104 the pipe 48 is provided with a large diameter branch 106 which leads directly to the inlet ends of the water flow channels of the condenser 46. The upper end of the pipe 48 is provided with a diverging portion, or diffuser 107.

Preferably the filter screen 102 is mounted in bearings and is provided with a suitable drive (not shown) for rotating it about the vertical axis of the pipe 48. A small sector of the upper surface of the screen 102 is exposed to the open end of flush line 108 which ejects high velocity water downwardly through the filter sector and then outwardly through a flushing outlet 110 in the pipe 48. The flush line 108 obtains its water flow from a pump 112 which pumps water from the outlet of the condenser 46. Thus, operation of the pump together with intermittent or continuous rotation of the filter screen 102 reverse flushes any debris from the latter.

Since the upper portion of the power plant is subjected to surface current and the pipe 48 is subjected to deep water currents, there will usually be some horizontal bending forces acting on the pipe 48. To aid in relieving this effect the pipe is partially or wholly supported by a buoyant structure attached thereto below the framework 14. This structure may take various forms and, as shown, includes a rigid ring 114 surrounding the pipe 48 and secured thereto by radially extending cables (not shown). The ring 114 is supported in the water by one or more buoyant tanks 116 connected just above the ring by means of cables. The ring 114 is also provided with electric motor-driven propellers 118 disposed about the periphery thereof to aid in maintaining the pipe 48 in alignment with the tube 98. As a further aid in lessening horizontal bending forces, the uppermost section of the pipe 48 is constructed of an upper portion whose lower end is funnel-shaped to receive the upper end of the lower portion.

Referring again to the cold water flow circuit a pump 118 and line 120 are provided for withdrawing water from the condenser outlet for use as a coolant in various equipment within the hull 10. The water may be employed, for example, to air condition living quarters for the crew, to cool auxiliary equipment, such as the propane compressor 94 and condenser 96 or electrical transformers. If it becomes necessary or desirable to evaporate sea water to obtain fresh water, either for use in the power plant or on a larger scale, the cool water obtained from the condenser outlet may also be used to condense the evaporated sea water.

While the cool sea water can be employed as an indirect coolant for the generator 22 it is desirable to utilize the heat from the latter for a useful purpose. It is conventional practice to cool the windings of heavy-duty generators with circulating hydrogen which is then itself cooled in a separate heat exchanger. In the present arrangement a generator system of this kind is employed the heat exchanger being illustrated at 122. In place of water as a coolant for the hydrogen, however, liquid propane is employed, and the heat exchanger 122 is utilized as an auxiliary propane boiler for the production of power. As shown, liquid propane is conducted to the heat exchanger 122 through a line 124 which contains a pump 126. Propane vapor generated and slightly superheated by the warmed hydrogen in the heat exchanger 122 passes to a turbine 128 which delivers the work of expansion of the vapor to an auxiliary generator 130. The expanded propane flows into one of the exhaust lines 60 from one of the main turbines 20.

Alternatively the heat exchanger 122 may be cooled with propane from one of the lines 58 from the main boiler and the resulting superheated propane vapor passed to one of the main turbines 20 thus omitting the auxiliary turbine 128.

The access tube 28, as already briefly described, extends into the framework 14 to a level below the boiler 34 and serves several purposes. Firstly, it will be seen that the pumps 26, 29, 56, 72, 118 and 126 are mounted on the exterior of the access tube 28 with their respective motors located inside the tube 28 for easy maintenance. The other submerged equipment is serviced by divers who descend the tube 28 in an elevator 132 and enter the water through the compression chambers 30 which are located at intervals along the tube 28. Each chamber 30 is entered from the tube 28 through a watertight door 134 after which the interior of the chamber 30 is pressurized with air or an oxygen-containing gas mixture suitable for breathing to the pressure of the sea at that level. Divers may then open a watertight door 136 and emerge onto the framework 14 for servicing the submerged equipment supported thereon. The uppermost chamber 30 is provided with an intermediate watertight door 138 which divides the chamber into inner and outer chambers. The outer chamber may be maintained continuously at the pressure of the sea and the inner chamber used in the previously described manner. This procedure permits a new working crew to prepare for work while another crew is still working.

The hull 10 together with its framework 14 and most of its submerged equipment will conveniently be constructed in a horizontal position in a shipyard and floated to its site in the same position by means of large buoyancy tanks or ships in the manner of present-day floating drilling barges. At the site the power plant will be righted and anchored in any suitable manner as with anchors and chains, one of the latter being illustrated at 140. The cold water pipe 48 is then assembled and lowered from the deck 100 of the hull in the manner described above. The resulting structure will be very stable and quite independent of ordinary surface waves and winds. To aid in maintaining a vertical position motor-driven propellers 142 or any other suitable form of marine thrusters, may be provided on the hull 10. These thrusters 142 may be controlled by the crew within the hull 10 by radio or radar triangulation to two shore-based control stations. Since structure is mostly under water it will not have a large percentage of excess buoyancy. Therefore empty tanks 144 are shown flexibly attached to the hull for emergency or trim buoyancy. They also can be disposed in a circular pattern around the hull to act as wave dampers.

Referring now to FIGURES 3 and 4 there is shown in simplified form a heat exchanger core which is well adapted for use in either the propane boiler 34 or the propane condenser 46. As has been described above the present invention, by submerging the boiler 34 and condenser 46 below sea level to appropriate depths, equalizes the pressures on opposite sides of the partition walls or other structures which separate the propane flow channels A, B, C and D from the water flow channels. Accordingly, the partition walls in these heat exchangers can be of very thin construction. This not only reduces the cost of the equipment by requiring less material and supporting structure for the core but increases the rate of heat transfer between the fluids. These factors are of vital importance in the present invention because the temperature differential between the fluids is small and because tremendous amounts of sea water must be used to obtain useful power.

As seen in FIGURES 3 and 4 a suitable form of heat exchanger core 146 is economically constructed of a plurality of equi-sized, thin, rectangular sheets 148a, 148b, 148c, etc., disposed in coextensive relationship and separated from each adjacent sheet by a space. Every other space is divided into a plurality of parallel water flow channels by means of a plurality of elongated, parallel blocks 150 which extend from one end of the sheets 148 to the other. The alternate spaces between the sheets are divided into a plurality of transverse propane channels by means of a plurality of spaced blocks 152 which extend across the core 146. The propane channels are separated into the groups A, B, C and D by special blocks 152' which are of greater length than the others so as to project beyond the edges of the sheets. The ends of the blocks 152' may be sealed to the interior of whatever casing is provided for the core 146 thereby maintaining the flow in the sets of channels separate from each other.

The blocks 150, 152 and 152' may be constructed of metal, plastic or other material suitable for use with sea water or propane. The sheets and blocks are shown as being flat, but they may be wave-shaped to increase turbulence. If desired, the blocks may be omitted and the sheets crimped with alternate grooves and ridges to maintain the desired spacing. The number of sheets and blocks and the size thereof may vary widely, and it will be understood that the arrangement of FIGURES 3 and 4 is merely exemplary.

In FIGURE 5 there is shown in more detail a suitable construction for the cold water pipe 48. As shown, the pipe 48 is of double walled construction and is formed of an inner smooth walled pipe 154 which conducts the water with a minimum of pressure drop and an outer corrugated pipe 156. Radially disposed cables 157 are connected between the pipes 154 and 156 at axially spaced intervals, and the annulus between the pipes is filled with a lightweight, foamed plastic material 158. This construction produces a pipe which has more or less neutral buoyancy in water due to the sealed annulus which is free of water. The foamed plastic material aids in maintaining the inner and outer pipes in alignment and serves as insulation to prevent warming of the cold sea water passing through the inner pipe 154. The corrugated nature of the outer pipe 156 provides radial stiffness to the assembly and permits slight flexing under the action of sea currents.

OPERATION

The procedures for constructing the power plant and completing and anchoring the assembly at an offshore, deep-water site have been generally described above. The operation of the auxiliary equipment, such as the filter screen 102, separator tank 70, generator heat exchanger 122 and gas purge tank 78 has been included in the physical description of these parts and need not be repeated.

Once the hull 10 and its framework 14 have been located and fully assembled in the sea at a point where warm surface water (e.g., 77° F.) overlies cold deep water (e.g., 50° F.) the operation of the plant to extract power from the sea is as follows, assuming that the propane circuit has been charged with propane.

Propane vapor from the boiler 34 passes through the lines 58 to the turbines 20 where it is expanded to produce mechanical power for driving the generator 22. Electric current from the latter is transmitted to shore by means of the cable 32 which passes downwardly through the access tube 28. From the turbines 20 the expanded propane passes through the lines 60 to the separate propane channels A, B, C and D of the condenser 46 where it is condensed at its saturation pressure by the 50° F. sea water being pumped up through the pipes 48 and 106 by the pump 50.

As previously discussed, the condenser 46 is submerged in the sea to a depth of 173 feet at which the sea water pressure is about equal to the pressure of the condensing propane thereby tending to equalize the pressures on opposite sides of the heat exchanger sheets 148a, 148b, etc. in the condenser 46. Exact balancing of the pressure differential is not achieved, however, because the large flow of water which is required in order to effect the necessary cooling creates a pressure drop along the water channels. In order to prevent this change in pressure from creating a large pressure differential between the water channels and the propane channels, the condenser is inclined with its water discharge end lower than the water inlet end, and the propane channels are divided into the separate sets A, B, C and D which operate at pressures substantially corresponding to the pressure in the water channels. The number of sets of propane channels will vary depending on how closely it is desired to balance the pressure differentials. The cost of heat exchanger construction will decrease with a decrease in pressure differentials, and the saving will, in practice, be balanced with the cost of the separate turbines which are employed for the separate propane streams of different pressure. Separate turbines are employed for each propane stream in order to increase the efficiency of the system. The plural turbine arrangement increases the available work per pound of sea water at a given amount of heat exchanger surface area, or the available work per unit of surface area for a given amount of water.

The condensed propane in the condenser 46 is returned to the boiler 34 by means of the pump 56 and the line 54. Like the condenser, the boiler is provided with four sets of propane channels A, B, C and D which are arranged with respect to the straight-through water channels to minimize pressure differentials on different parts of the heat exchanger sheets 148a, 148b, etc. Warm surface water at 77° F. passing through the water channels of the boiler 34 heats the liquid propane to its boiling point and the vapors are passed to the turbines 20 to repeat the cycle. At 77° F. propane boils at 137 p.s.i.a. and, accordingly, the boiler is located at about 276 feet below sea level in order to provide water at about 137 p.s.i.a. As with the condenser 46 the high volume water flow creates a pressure drop along the water channels which is equalized with the propane pressure by inclining the boiler.

Since the internal operating pressures of the condenser 46 and boiler 34 are determined to a large extent by the vapor pressure of propane at the high and low water temperatures, equalization of pressure differentials in these pieces of equipment can be approached only by submerging them to the depth called for by the temperatures of the warm and cold water. For example, if surface water were available at 82° F. rather than 77° F., the boiler 34 should be submerged at a greater depth than 276 feet in order to increase the water pressure thereon to the higher vapor pressure of the propane. Accordingly, the ballast tank 24 and its pumping system 26 will be employed to raise or lower the hull 10 in the sea primarily in dependence on the temperatures of the available warm and cold water, which may vary with the season.

The internal propane temperature also varies with the load on the turbines 20, and it is therefore not always possible to equalize the pressure in both boiler 34 and condenser. Since condenser water temperature will not ordinarily vary as much as boiler water temperature, and since the saturation pressure in the condenser does not change as much per degree as in the boiler, it is more important to control the submergence level of the boiler. In addition, it will usually be desirable to submerge the equipment to a depth at which water pressure is slightly higher than the propane pressure so that any heat exchanger leak will be a water leak and not a propane loss to the sea. The arrangement of boiler and condenser passages as shown by the sections A, B, C and D, in conjunction with the four separated turbines 20 is important also in that it improves the plant efficiencies because of a better counterflow arrangement of the heat transfer surfaces. For example, let us take a design case which is typical of conditions that might actually be encountered. Warm water enters the boiler 36 at 79° F. and leaves at 77° F. Without separating the boiler 36 into four chambers the boiling tempearture could be 72° F. Cold water enters the condenser 46 at 43° F. and leaves at 47° F. condensing temperature with one chamber would be 52° F. If in this case the condenser 46 and boiler 36 are divided into four separate propane circuits as shown, the actual power would be increased by 1.4% without any addition to the heat transfer surface. In the case of the separated chambers in the condenser the condensing temperatures would be successively 50.3° F., 51.3° F., 52.3° F., and 53.3° F. This gives a counter flow heat transfer effect which, as is well known, improves heat transfer.

The warm water inlet must usually be maintained close to the water surface 12 in order to gather the warmest possible water. When the hull 10 is raised or lowered, the upper length 36c of the water inlet pipe 36 may be pivoted about the upper joint 38 to maintain the inlet end near the surface 12. If there is a surface current its flow may be used to advantage by pivoting either or both joints 38 to allow the current to carry water into the inlet, thereby reducing the required pumping power. To conserve both warm and cool water layers in the sea the boiler water outlet should discharge the water upwardly and away from the inlet and the condenser water outlet should discharge its water downwardy toward the cold layer.

Referring again to the operation of the condenser 46 it has been determined that the total power for pumping the cold water from the deep sea must achieve the following:

(1) Accelerate the water at the inlet of the pipe 48 from essentially zero velocity to the velocity in the pipe 48.

(2) Overcome the friction resistance due to flow through the pipe 48.

(3) Overcome the loss caused by the diffuser 107 in lowering the water velocity below the screen 102.

(4) Overcome the turbulence and friction losses in the pump 50.

(5) Overcome the frictional resistance in the condenser flow passages.

(6) Overcome the resistance due to the diffusion of velocity at the condenser outlet 52 to the low velocity in the sea.

(7) Overcome the difference in density to lift the cold heavy water from great depths through the somewhat warmer water surrounding the pipe.

The last-mentioned effect is an appreciable part of the resistance to water flow and causes a very large percentage of the power required for the condensing water pump 50. For this reason it may be advantageous economically to extend the discharge pipe 52 from the condenser 46 a considerable distance down into the sea. This extension of the discharge pipe helps to recover the head of the dense water which had to be lifted to the upper levels.

Because the condenser water pump 50 does work on the water in order to pump it through the pipe 48 and condenser 46, it also raises the water's temperature somewhat. For example, in one calculated case the pump work required was such that it would raise the temperature of the cold water by 0.4° F. For this reason it may be advantageous to put the condenser water pump 50 on the downstream side of the condenser 46 instead of between the water pipe 48 and the condenser 46 as shown on the drawings. A disadvantage of putting the pump 50 on the downstream side of the condenser 46 is that the pump will then require a diffuser in addition to the one used as the water approaches the condenser, and this adds one additional diffuser loss. Design conditions must be completely analyzed for each case, before deciding whether the pump 50 should be put on the inlet or the outlet of the condenser 46.

Since the boiler 34 and condenser are at different depths, it is obvious that if no water is pumped through them the propane pressure would be the same in both and they could not be equalized to external water pressure. Therefore, effecting equalized heat exchanger pressures in both stopped and operating conditions presents somewhat of a problem. The relief valves 60 and 62 protect the heat transfer sheets 148a, 148b, etc. from rupture, but a careful procedure must be followed in order to charge the propane circuit and place it in operation. The following start-up procedure may be employed after the plant has been anchored in the sea.

(1) Fill the propane circuit with water and open appropriate valves (not shown) into the water circuit to equalize interior and exterior pressures.

(2) Make up a supply of pressurized propane. This may be accomplished with an auxiliary engine-driven generator and propane compressor, pumps and other equipment illustrated at 160 in FIGURE 2.

(3) Close the valves between the propane circuit and the water circuit and purge water from the upper part of the propane circuit with compressed nitrogen or other inert gas.

(4) Begin charging the upper part of the propane circuit with propane, using the compressor of the equipment at 160. Valve 74 should be opened at this time to allow the propane pressure to force the internal water out of the propane circuit through the valve 74.

(5) When the interface between internal water and propane reaches the level of the condenser 46, the cold water pump 50 is started. This circulates cold water through the condenser 46 causing the propane therein to condense and permitting more propane to be added to the circuit by the compressor at 160.

(6) Start the condensate pump 56 which then pumps water, and finally liquid propane, through the line 54 to the boiler 34. As liquid propane reaches the boiler 34, it rises through the water in the lines 60 to the water-propane interface at the level of the condenser 46. Since this water is warm, the liquid propane will vaporize as it rises.

(7) Start the boiler water pump 40 to increase boiling of propane in the boiler 34 and cause the vapor to flow to the turbines 20.

(8) Start the pump 72 to force the water in the propane channels in the boiler 34 and in the lines 58 out through the valve 74.

(9) When the propane circuit is free of water close the valve 74. The circuit is now full of propane and the turbines 20 are in operation.

During emergency stopping of the power plant, the relief valves 60 and 62 protect the condenser 46 and the boiler 34 from excess differential pressure. However, this causes an undesirable loss of propane into the sea. This loss can be avoided by the following procedure:

(1) Stop propane flow to the boiler 34 with a suitable valve (not shown). This will gradually reduce gas flow to the turbines 20 which soon stop running.

(2) Pump the liquid propane to the storage tanks 88 using the pump 56 and suitable lines (not shown).

(3) Open the valve 74 and allow sea water to fill the boiler 34 and piping up to the level of the condenser 46.

(4) Withdraw propane from the upper part of the circuit with the compressor at 160. Condense this propane and store it in the tanks 76.

(5) Stop the water pumps 40 and 50.

Since in a shut-down condition the propane circuit is open to the sea through the valve 74, the turbines 20 cannot be opened for maintenance unless some precaution is taken to prevent flow of sea water through the pipes 54 and 60 into the hull 10. The hull may be raised to position the turbines above water level or, alternatively, the compartments in which the turbines are located may be pressurized.

It will be appreciated that the power plant is illustrated in simplified form and that the usual controls for the various valves and for the turbines 20 and generator 22 have not been shown. It is conventional practice in power plants to control turbine speed to maintain constant frequency of electrical power, and the present power plant will, in practice, incorporate whatever controls and auxiliary equipment is called for in conventional practice.

While the power plant has been described as employing propane as the working fluid, other gases may be used. The following table shows some of the gases, including propane, which can be used, together with their saturation pressures at typical warm and cold water temperatures and the required submergence depths for condenser and boiler.

| Gas | P.s.i.a. At 77° F. | P.s.i.a. At 43° F. | Boiler Depth, Ft. | Condenser Depth, Ft. |
|---|---|---|---|---|
| Propane | 137 | 82 | 278 | 154 |
| Propylene | 165 | 101 | 341 | 197 |
| R-12, $CCl_2F_2$ | 94.5 | 54.5 | 182 | 83 |
| R-22, $CHClF_2$ | 153 | 88 | 314 | 168 |
| R-13B1, $CBrF_3$ | 235 | 145 | 499 | 296 |
| R-13, $CClF_3$ | 520 | 330 | 1,140 | 712 |
| Butane | 36 | 19 | 51 | 12.7 |
| Isobutane | 52 | 29 | 87 | 35 |

Proplyene is slightly more expensive than propane and somewhat more soluble in water. It would require a smaller turbine, but also greater submergence depths where the diving operations would be more difficult.

R-12 and R-22 are non-flammable but would require larger turbines than propane and are more expensive. R-13 and R-13B1 are non-flammable but are expensive and require excessive submergence depths.

Butane and isobutane are advantageous from the standpoint of cost, but they require large turbines. The relatively shallow submergence levels are disadvantageous because the condenser and boiler would be subject to wave action.

In general the halocarbons possess an advantage over the hydrocarbons in that the liquid densities of the former are greater than that of water. The presence of these heavier liquids in the boiler 36 and condenser 46, which are at different submergence levels, creates enough pressure difference so that a boiler feed pump could, in some cases, be omitted. Even when the lighter hydrocarbons are employed as the working fluid, less boiler feed pump power is required than would be the case if the condenser and boiler were at the same level.

As previously indicated, the present invention is not limited to the use of devices for extracting mechanical energy from the hot compressed vapor generated in the boiler 34. One system which may be employed generates electric current directly from the moving stream of vaporized working fluid by the direct energy conversion technique known as electrogasdynamics (EGD). By this technique, described in Patent No. 2,638,555 and in Industrial Research, July 1966, pages 71–76, a moving dielectric gas is seeded with ions of a single polarity, and the ions are transported by the gas against an opposing electrical field. The kinetic energy of the gas performs work in transporting the ions against the opposing potential. This work appears in the form of a high electric potential in the circuitry of the machine and may be drawn off in the form of direct electric current. In practice, the gas stream in equipment of this kind is injected with particulate matter in the form of an aerosol with the result that the ions become attached to the aerosol particles. This reduces the slip, or difference in velocity between the gas stream and the moving ions and increases the efficiency of the process by assuring that the gas stream performs work on the ions.

FIGURE 6 illustrates schematically how the EGD technique may be employed to obtain electric power from the vapor generated in the boiler of the previously described power plant. The boiler is illustrated at 34', and the vapor discharge line is illustrated at 58'. The downstream end of the line 58' connects with a restricted line 160 with which EGD equipment 162 is associated. The downstream end of the line 160 connects with the condenser 46' through line 60'. Condensed propane returns to the boiler 34' by way of the line 54' and the pump 56'. Warm sea water enters the boiler 34' through pipe 36' and is returned to the sea through pipe 42'. Cold sea water enters the condenser 46' through pipe 48' and is returned to the sea through pipe 52'.

The EGD equipment includes an ionizing electrode 164 and a collector electrode 166 spaced axially from each other within the high vapor velocity line 160. The electrodes are maintained at different voltages which create a force to the right on the ions generated in the vapor stream by the ionizing electrode 164. The kinetic energy of the flowing vapor stream moves the ions against this force with the result that an opposite voltage difference is generated between the electrodes 164 and 166. Direct electric current can then be drawn off by a load 168.

In order to propel the ions effectively and prevent slip between them and the vapor stream finely divided liquid particles of propane are injected into the vapor stream in the line 160 by a spray nozzle 170. Liquid propane for this purpose is obtained from the boiler 34' by means of a pump 172. Droplets of other liquids may be injected in place of propane provided that the injected liquid has a lower vapor pressure than propane and has suitable electrical and molecular characteristics. Butane, various halocarbons, water and alcohol may be used. The injected liquid may carry suspended solid particles. In the case of propane and many other saturated vapors, they expand into the mixed vapor-liquid zone during the isentropic expansion process. In this case it may not be necessary to have the pump inject additional liquid droplets.

It will be appreciated that the expansion of the vapor may be carried through several generating tubes 160 in series if it is desired to generate lower voltages, requiring lower gas velocities. For larger capacity a number of generating tubes 160 may be arranged in parallel.

It will thus be appreciated that the present invention provides an efficient plant for extracting power from the sea. While a specific embodiment has been described, the details thereof are intended to be illustrative of the principles involved and are not intended to be limiting except as they appear in the appended claims.

We claim:

1. Apparatus for obtaining power from a naturally occurring body of water which is of sufficient depth to provide relatively warm surface water and relatively cold deep water, said apparatus comprising: boiler means for boiling a liquefied working fluid near the temperature of the warm water, said boiler means including a heat exchanger having separate sets of flow channels for passing warm and cold fluids in heat exchange relationship; means for flowing a stream of the warm water through one set of said boiler channels; means for passing a liquefied working fluid through the other set of boiler channels; power extracting gas expansion means having an outlet and an inlet, the latter being connected in fluid flow relationship to the other boiler flow channels; condenser means for condensing vaporized working fluid, said condenser means including a heat exchanger having separate sets of flow channels for passing warm and cold fluids in heat exchange relationship, at least one of said boiler means and condenser means being submerged below the surface of the body of water to a depth at which the water pressure is about equal to the vapor pressure of the working fluid at the temperature of the water flowing through the submerged heat exchanger to thereby achieve a low pressure differential between the separate sets of flow channels; conduit means connecting the outlet of said power extracting means to one of the sets of condenser channels; means for flowing a stream of the cold water through the other set of condenser channels to thereby condense said fluid; and means for flowing condensed working fluid from said one set of condenser channels to said other set of boiler channels.

2. Apparatus as in claim 1 wherein said means for flowing a stream of the warm water to said boiler means includes conduit means having an upper inlet and disposed a short distance below the surface of the body of water and a lower outlet end communicating with said one set of boiler channels; and pump means for forcing surface water downwardly through said last-mentioned conduit means.

3. Apparatus as in claim 1 wherein said means for flowing a stream of cold water to said condenser means includes conduit means having a lower inlet end disposed deep in the body of water and an upper outlet end communicating with said other set of condenser channels; and pump means for forcing deep water upwardly through said last-mentioned conduit means.

4. Apparatus as in claim 1 wherein said boiler means and said condenser means are heat exchangers, each having straight-through water channels extending from one end of the heat exchanger to the other and a plurality of distinct sets of working fluid channels extending transversely of said water channels, each set being sealed against communication with the other sets and disposed at a different position along the length of the water channels, wherein each heat exchanger is sloped so that one end of said water channels is higher than the other end whereby the pressure in each set of working fluid channels will nearly equal the pressure in the portion of the water channels associated with that set.

5. Apparatus as in claim 4 wherein said power extracting means includes separate power extracting means for each set of working fluid channels in said boiler, each of said power extracting means being also connected to a different set of working fluid channels in said condenser.

6. Apparatus as in claim 4 wherein the means for flowing condensed working fluid from said condenser to said boiler includes an outlet pipe associated with each set of condenser working fluid channels, a main condensate line, an inlet pipe associated with each set of boiler working fluid channels, and means for connecting opposite ends of said condensate line to said sets of boiler and condenser channels while preventing flow of working fluid from one set of channels to another set associated with the same heat exchanger.

7. Apparatus as in claim 6 wherein said connecting means includes a U-tube between each outlet pipe and one end of said main condensate line and a U-tube between each inlet pipe and the other end of said main condensate line.

8. Apparatus as in claim 1 wherein said power extracting means includes a mechanically driven electric generator and means for circulating a fluid coolant in heat exchange relationship with parts of said generator and further comprising means for extracting work from said fluid coolant, said means including a heat exchanger associated with said circulating means for passing a stream of said working fluid in a liquid state in heat exchange relationship with said fluid coolant and thereby vaporizing a portion of said stream of working fluid.

9. Apparatus as in claim 8 wherein said work extracting means further includes a turbine having its inlet connected to said fluid coolant heat exchanger for receiving vaporized working fluid and an electric generator operated by said turbine.

10. Apparatus as in claim 1 further comprising means for buoyantly supporting said power extracting means, said boiler means and said condenser means in the body of water, said supporting means including a floating buoyant hull enclosing said power extracting means and a depending framework supporting said boiler means and said condenser means.

11. Apparatus as in claim 10 including means for controlling the buoyancy of said hull whereby the level of said hull in the body of water, and the depth of submergence of said boiler and said condenser, may be controlled in order to equalize the pressure in the working fluid channels with the pressure in the water channels.

12. Apparatus as in claim 10 including at least one access tube depending from said hull, said access tube having a plurality of double-door watertight chambers associated therewith at different depths, one of said doors opening to the body of water and the other opening into the interior of said access tube.

13. Apparatus as in claim 10 wherein the means for flowing cold water to said condenser means includes conduit means suspended by its upper end from said buoyant hull and having a lower inlet and disposed below said framework.

14. Apparatus as in claim 13 wherein said cold water conduit means is provided with at least one buoyancy device secured thereto intermediate its ends.

15. Apparatus as in claim 13 further including thruster means for acting on the water in order to maintain the lateral position of the hull in the body of water and to minimize bending forces on said cold water conduit means.

16. Apparatus as in claim 1 wherein both said boiler means and said condenser means are submerged in said body of water to depths at which the water pressures are about equal to the vapor pressures of the working fluid at the temperatures of the water flowing through the heat exchangers.

17. A method of extracting power from a body of naturally occurring water which is of sufficient depth to provide relatively warm surface water and relatively cold deep water comprising: maintaining a source of liquid working fluid which has a superatmospheric vapor pressure at the temperatures of the warm and cold water and a vapor density at these temperatures which is substantially greater than the vapor density of water; boiling a portion of said working fluid by passing the same in heat exchange relationship with a stream of the warm water which is at a pressure about equal to the vapor pressure of said working fluid at the temperature of the warm water; passing the vaporized working fluid to a turbine to extract energy from the vapor by expansion thereof; condensing the expanded working fluid at a lower temperature and pressure than those in said boiling step by passing said expanded working fluid in heat transfer relationship with a stream of the cold water which is at a pressure about equal to the vapor pressure of said working fluid at the temperature of the cold water; and returning the condensed working fluid to said source.

18. A method of extracting power from a body of naturally occurring water which is of sufficient depth to provide relatively warm surface water and relatively cold deep water comprising: providing a mass of liquid working fluid which has a superatmospheric vapor pressure at the temperatures of the warm and cold water and a vapor density at these temperatures which is substantially greater than the vapor density of water; conducting a stream of the warm water in heat exchange relationship with a stream of the working fluid to vaporize a portion of the latter; passing the vaporized working fluid to a power extracting gas expansion means and extracting energy from said vaporized working fluid; conducting a stream of the cold water in heat exchange relationship with the expanded working fluid to condense the latter, at least one of said vaporizing and condensing operations being carried out by conducting the stream of water to a depth in said body of water where the water pressure is about equal to the vapor pressure of the working fluid which is undergoing heat exchange with said conducted stream of water; and returning the condensed working fluid to said source.

19. A method as in claim 18 wherein said working fluid is selected from the group consisting of propane, propylene, $CCl_2F_2$, $CHClF_2$ $CBrF_3$, $CClF_3$, butane and isobutane.

20. A method as in claim 18 wherein pressure is maintained in said water streams by carrying out said boiling and condensing steps below the level of the sea, said boiling step being carried out at a lower depth than said condensing step.

21. A method of extracting power from a body of naturally occurring water which is of sufficient depth to provide relatively warm surface water and relatively cold deep water comprising: providing a mass of liquid working fluid which has a superatmospheric vapor pressure at the temperatures of the warm and cold water and a vapor density at these temperatures which is substantially greater than the vapor density of water; conducting a stream of the warm water to a depth in said body of water where the water pressure is about equal to the vapor pressure of said working fluid at the temperature of the warm water; vaporizing a portion of said liquid working fluid at said depth by passing a stream thereof in heat exchange relationship with said stream of warm water; passing the vaporized working fluid to a power extracting gas expansion means and extracting power from the vaporized working fluid; conducting a stream of the cold water to a depth in said body of water where the water pressure is about equal to the vapor pressure of said working fluid at the temperature of the cold water; condensing the expanded working fluid at said last-mentioned depth by passing it in heat exchange relationship with said stream of cold water; and returning the condensed working fluid to said source.

References Cited by the Examiner
UNITED STATES PATENTS

| | | | |
|---|---|---|---|
| 1,952,520 | 3/1934 | Urquhart | 60—26 |
| 2,006,985 | 7/1935 | Claude et al. | 60—26 X |
| 2,595,164 | 4/1952 | Nisolle | 60—26 X |

OTHER REFERENCES

Power Magazine, volume 65, No. 9, March 1, 1927, pages 328–330 inclusive, "Steam Power From the Ocean in the Tropics."

Scientific American, May 1927, pages 340 and 341, "Inexhaustible Power From Sea Water—A Dream or a Prophecy."

EDGAR W. GEOGHEGAN, *Primary Examiner.*